(12) United States Patent
Kubota (10) Patent No.: US 8,238,043 B2
(45) Date of Patent: Aug. 7, 2012

(54) IMAGING LENS SYSTEM AND IMAGING APPARATUS

(75) Inventor: Takashi Kubota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 12/957,789

(22) Filed: Dec. 1, 2010

(65) Prior Publication Data

US 2011/0128637 A1 Jun. 2, 2011

(30) Foreign Application Priority Data

Dec. 2, 2009 (JP) .................. 2009-274171

(51) Int. Cl.
*G02B 13/04* (2006.01)
*H04N 5/225* (2006.01)

(52) U.S. Cl. ......... 359/753; 359/749; 348/335; 348/340

(58) Field of Classification Search .............. 348/335, 348/340; 359/749, 753, 781, 784
See application file for complete search history.

(56) References Cited

U.S. PATENT DOCUMENTS

| | | | |
|---|---|---|---|
| 4,867,546 A | 9/1989 | Nishioka et al. | |
| 5,251,073 A | 10/1993 | Schauss | |
| 6,762,890 B2 | 7/2004 | Sato et al. | |
| 7,041,958 B2 | 5/2006 | Ito | |
| 7,161,132 B2 | 1/2007 | Ito | |
| 7,933,077 B1 * | 4/2011 | Tsai ..................... | 359/753 |
| 2011/0051261 A1 * | 3/2011 | Ando et al. ............ | 359/753 |

FOREIGN PATENT DOCUMENTS

| | | |
|---|---|---|
| EP | 0 473 117 A1 | 3/1992 |
| JP | 3076098 | 6/2000 |
| JP | 3281583 | 2/2002 |
| JP | 3595897 | 9/2004 |
| JP | 3756114 | 1/2006 |
| JP | 2008-139644 | 6/2008 |

(Continued)

OTHER PUBLICATIONS

Extended European Search Report issued on Feb. 14, 2011 in corresponding European Application No. 10 19 3348.

*Primary Examiner* — David N Spector
(74) *Attorney, Agent, or Firm* — Oblon, Spivak, McClelland, Maier & Neustadt, L.L.P.

(57) ABSTRACT

An imaging lens system includes three lens groups having four lenses including a first lens, a second lens, a third lens, and a fourth lens arranged in order from an object side, and an aperture stop arranged between the first lens and the second lens. The second lens and the third lens are joined each other. The first lens is a negative meniscus lens having a convex surface at an object side. The second lens is a positive lens having a convex surface having a large curvature at an image side. The third lens is a negative lens having a concave surface having a large curvature at an object side. The fourth lens is a positive lens having a convex surface having a large curvature at an image side. The following conditions are satisfied:

$$1.4 < |f1/F| < 2.2$$

$$0.4 < |f1/f23| < 1.6$$

where F is a focal length of the entire imaging lens system, f1 is a focal length of the first lens, and f23 is a combined focal length of the second lens and the third lens which are joined each other. The following condition is satisfied:

$$1.80 < N1$$

where N1 is a refractive index of material of the first lens for a d line.

4 Claims, 7 Drawing Sheets

FOREIGN PATENT DOCUMENTS

| JP | 2009-20339 | 1/2009 |
| JP | 4245749 | 1/2009 |
| JP | 4248956 | 1/2009 |
| JP | 4283554 | 3/2009 |
| JP | 2009-230043 A | 10/2009 |
| JP | 4416411 | 12/2009 |

* cited by examiner

IMAGING LENS SYSTEM AND IMAGING APPARATUS

CROSS REFERENCE TO RELATED APPLICATIONS

The present application is based on and claims priority from Japanese Application Number 2009-274171, filed on Dec. 2, 2009, the disclosure of which is hereby incorporated by reference herein in its entirety.

BACKGROUND OF THE INVENTION

1. Field of the Invention

The present invention relates to an imaging lens system and an imaging apparatus.

2. Description of the Related Art

In recent years, digital still cameras and digital video cameras have become common as an imaging apparatus in which a solid-state image sensing device such as CCD, CMOS, or the like is used. In particular, such digital still cameras have been widely used instead of silver salt cameras.

Regarding a solid-state image sensing device used in such an imaging apparatus, a large number of pixels have been required. Accordingly, a high optical performance has been desired for the imaging lens. Furthermore, a compact-sized imaging apparatus having a design for portability has also been developed, and an imaging apparatus having both a high performance and a compact size has been greatly desired in the market. Accordingly, an imaging lens which not only has high-performance but is also compact-sized is desired as well.

Furthermore, speed of photographing has steadily increased, and a brighter lens as the imaging lens is desired.

In addition, in a case where a photographed image is received by the solid-state image sensing device, it is preferable that a light beam incident on a light receiving surface of the solid-state image sensing device enter the light receiving surface at a small incident angle. That is, an incident angle of an off-axial light beam is restricted in the imaging apparatus in which the solid-state image sensing device is used, and so-called shading occurs when the incident angle becomes large.

That is, a high telecentric performance in an image side is required for the imaging lens.

Furthermore, in terms of a compact size, it is preferable that the imaging lens be constituted of a small number of lenses.

In a case of a single-focus imaging lens used for a hand-held terminal and the like, which has been widely used in recent years, since a small-sized solid-state image sensing device is used, a configuration of the imaging lens having two or three lenses is effective. However, in a case where the number of pixels is 7 million or more, a large-sized solid-state image sensing device is required, so that it is difficult to sufficiently correct aberrations in a case of a small number of lenses, and a desired performance is difficult to be achieved.

If the number of lenses is increased in order to deal with the above, an entire optical length and size of a lens system are also increased, and a compact-sized lens system is difficult to be achieved. If an increase in the size of the lens system caused by an increase in the number of the lenses is to be suppressed by reducing a size of each lens, a refractive power of the small-sized lens is increased, so that influence due to manufacturing errors or assembly errors is increased, productivity worsens, and production cost increases.

Conventionally, Japanese Patent No. 3076098, Japanese Patent No. 3595897, Japanese Patent No. 3281583, and Japanese Patent No. 4248956 are known as documents disclosing an imaging lens including three lens groups having four lenses, which has the same lens-group configuration as that of an imaging lens according to the present invention.

An imaging lens disclosed in Japanese Patent No. 3076098 does not necessarily suffice for a performance which has been desired in recent years in terms of distortion and the like. Regarding imaging lenses disclosed in Japanese Patent Nos. 3595897 and 3281583, entire lengths thereof are comparatively long, and there are further rooms for improvement in terms of a compact size. Regarding an imaging lens disclosed in Japanese Patent No. 4248956, the f-number thereof is 3.5 and is a little dark, and there is further room for improvement in terms of brightness.

In addition, an imaging lens disclosed in Japanese Patent No. 4245749 is known as an imaging lens preferably used for an imaging apparatus in which a solid-state image sensing device is used. However, a scanning lens thereof includes four lens groups having five lenses, and a lens configuration thereof is different from that of an imaging lens according to the present invention.

SUMMARY OF THE INVENTION

The present invention aims to achieve a bright, high-performance, and compact-sized imaging lens system having a high telecentric performance in an image side in a configuration including three lens groups having four lenses.

An imaging lens system according to an embodiment of the present invention includes three lens groups having four lenses including a first lens, a second lens, a third lens, and a fourth lens arranged in order from an object side, and an aperture stop arranged between the first lens and the second lens. The second lens and the third lens are joined each other. The first lens is a negative meniscus lens having a convex surface at an object side. The second lens is a positive lens having a convex surface having a large curvature at an image side. The third lens is a negative lens having a concave surface having a large curvature at an object side. The fourth lens is a positive lens having a convex surface having a large curvature at an image side. The following conditions are satisfied:

$$1.4 < |f1/F| < 2.2 \quad (1)$$

$$0.4 < f1/f23 | < 1.6 \quad (2)$$

where F is a focal length of the entire imaging lens system, f1 is a focal length of the first lens, and f23 is a combined focal length of the second lens and the third lens which are joined each other. Furthermore, the following condition is satisfied:

$$1.80 < N1 \quad (3)$$

where N1 is a refractive index of material of the first lens for a d line.

DETAILED DESCRIPTION OF THE PREFERRED EMBODIMENTS

Hereinafter, embodiments of the present invention will be explained in detail with reference to the accompanying drawings.

An imaging lens system or an imaging lens includes, for example, as shown in FIGS. 1, 3, 5, 7, and 9, three lens groups having four lenses including a first lens L1, a second lens L2, a third lens L3, and a fourth lens L4 arranged in order from an object side, and an aperture stop S arranged between the first lens L1 and the second lens L2. The second lens L2 and the third lens L3 are joined each other. The first lens L1 is a negative meniscus lens having a convex surface at an object side. The second lens L2 is a positive lens having a convex surface having a large curvature at an image side. The third lens L3 is a negative lens having a concave surface having a large curvature at an object side. The fourth lens L4 is a positive lens having a convex surface having a large curvature at an image side. The following conditions are satisfied:

$$1.4 < |f1/F| < 2.2 \quad (1)$$

$$0.4 < |f1/f23| < 1.6 \quad (2)$$

where F is a focal length of the entire imaging lens system, f1 is a focal length of the first lens L1, and f23 is a combined focal length of the second lens L2 and the third lens L3 which are joined each other. Furthermore, the following condition is satisfied:

$$1.80 < N1 \quad (3)$$

where N1 is a refractive index of material of the first lens L1 for a d line.

As to the imaging lens according to an embodiment of the present invention, the following condition may be satisfied:

$$N1 > N2 > N3 \geq N4$$

where N1 to N4 are refractive indexes of materials of the first lens L1 to the fourth lens L4 for d lines, respectively. The following condition may be satisfied:

$$0.5/mm < |f23/(F \cdot R5)| < 1.3/mm \quad (4)$$

where R5 is a curvature radius of a joined surface of the second lens L2 and the third lens L3. Also, the following conditions may be satisfied:

$$0.5 < |R1/R8| < 1.2 \quad (5)$$

$$1.5 < |R1/R2| < 2.0 \quad (6)$$

$$3.0 < |R4/R5| < 5.0 \quad (7)$$

where R1 and R2 are curvature radii of an object-side surface and an image-side surface of the first lens L1, respectively, R4 is a curvature radius of an object-side surface of the second lens L2, and R8 is a curvature radius of an image-side surface of the fourth lens L4.

In addition, in each of the above-mentioned conditions, a paraxial curvature radius is indicated as a curvature radius of a lens surface when the lens surface is an aspheric surface.

As to the imaging lens according to an embodiment of the present invention, it is preferable that the entire imaging lens system be extended to the object side to perform focusing, for example, the entire imaging lens system be integrally extended to the object side to perform focusing.

Figure 12:
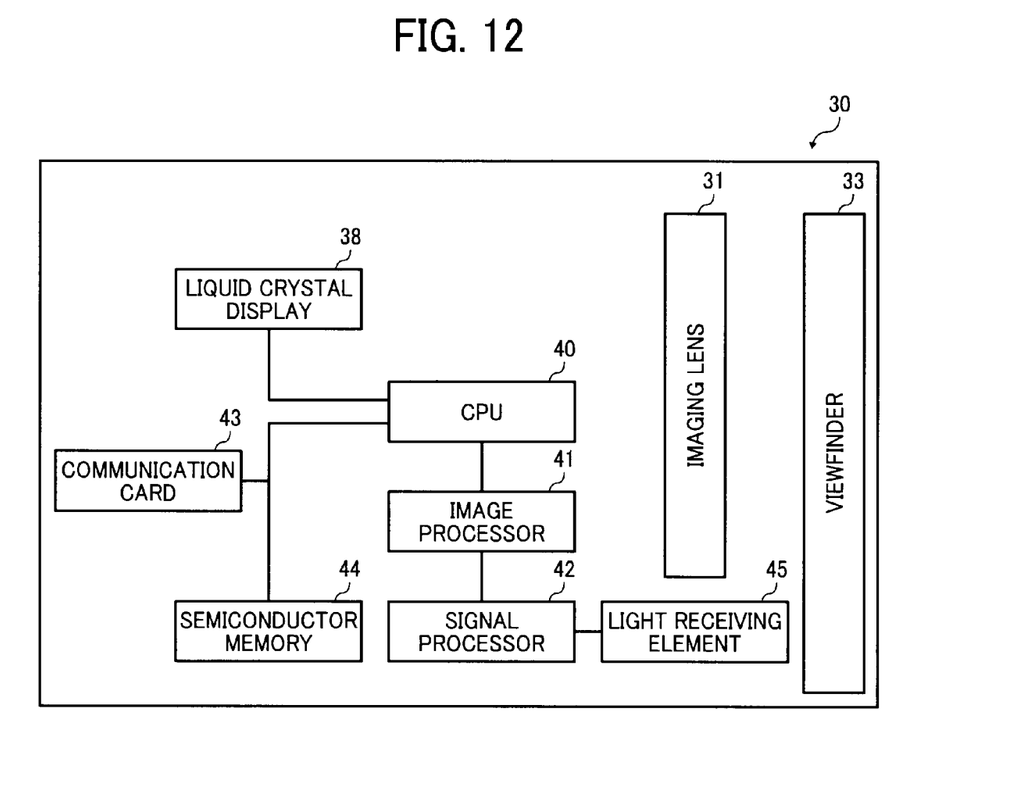
FIG. 12 is a view explaining a system configuration of the imaging apparatus in FIGS. 11A to 11C.

An imaging apparatus includes, for example, as shown in FIG. 12, the imaging lens according to an embodiment of the present invention, for example, a photographic lens configured to form an image and an image pickup device, for example, a solid-state image sensing device, a light receiving element, and the like configured to receive the image formed by the imaging lens.

Further explanations of the above will be provided.

As mentioned above, although the imaging lens according to an embodiment of the present invention is configured to have three lens groups having four lenses, the imaging lens is of a retrofocus type in which the first lens L1 as a first lens group is the negative lens, and in which a second lens group and a third lens group are positive, and includes the aperture stop S between the first lens group and the second lens group away from an image plane.

By the aperture stop S being arranged at this position, it is made possible to maintain a sufficient distance between an exit pupil and the image plane and achieve a fine telecentric performance of the image side. Furthermore, it is made possible to easily correct spherical aberration and coma aberration and also to reduce a lens diameter of the first lens L1.

The condition (1) is a condition to balance a positive optical power of the entire imaging lens system and a negative optical power of the first lens L1. In the condition (1), when |f1/F| is below the lower limit, spherical aberration and astigmatism tend to cause an excessive correction, coma aberration, on-axis chromatic aberration, and chromatic aberration of magnification also occur to a large extent, and it is difficult to achieve a desired performance. Furthermore, when |f1/F| exceeds the upper limit, both spherical aberration and astigmatism cause an insufficient correction, on-axis chromatic aberration and chromatic aberration of magnification also occur to a large extent, and it is difficult to achieve the desired performance.

The condition (2) is a condition to balance the negative optical power of the first lens L1 and a combined positive optical power of the second lens group. In the condition (2), when |f1/f23| is below the lower limit, the negative optical power of the first lens L1 is increased relative to the combined optical power of the second lens group, spherical aberration tends to cause an excessive correction, and on-axis chromatic aberration tends to cause an excessive correction. Furthermore, when |f1/f23| exceeds the upper limit, the negative optical power of the first lens L1 is reduced relative to the combined optical power of the second lens group, barrel-shaped distortion tends to be excessively corrected, and astigmatism tends to cause an insufficient correction.

The condition (3) is a condition to control N1: the refractive index of the material of the first lens L1.

The first lens L1 is the negative lens. In order that a function of the retrofocus mentioned above be sufficiently fulfilled, a negative refractive power has to be large. However, the first lens L1 is formed of material having a refractive index which is larger than 1.8, and thereby it is possible to achieve the desired function of the retrofocus without using a surface having an extremely large curvature, and it is made possible to reduce the lens diameter of the first lens L1 and easily achieve a compact-sized imaging lens.

It is more preferable that the refractive index of the material of the first lens L1 be 1.9 or more.

By the above-mentioned lens configuration and position at which the aperture stop S is arranged, it is made possible to achieve the fine telecentric performance in the image side. Furthermore, it is made possible to achieve a fine performance and a compact size by the conditions (1) to (3) being satisfied.

As described in an embodiment of the present invention, in a configuration in which the refractive indexes of the materials are reduced in series from the first lens L1 to the fourth lens L4, it is preferable that the conditions (4) to (7) be satisfied.

The condition (4) is a condition to control a relationship between an optical power included in the second lens group in which the second lens L2 and the third lens L3 are joined each other and an optical power included in the joined surface in the second lens group.

In a case where $|f23/(F \cdot R5)|$: a parameter is increased or reduced, it means that the optical power as the second lens group reduced or increased relative to 1/F: the optical power of the entire imaging lens system which satisfies the condition (1), or a refractive power of the joined surface is increased or reduced.

In the condition (4), when $|f23/(F \cdot R5)|$ is below the lower limit, astigmatism tends to cause an insufficient correction, and coma aberration also tends to cause an insufficient correction. Furthermore, when $|f23/(F \cdot R5)|$ exceeds the upper limit, astigmatism tends to cause an excessive correction, and coma aberration also tends to cause an excessive correction.

The condition (5) is a condition to control a relationship between refractive powers of a far-object-side lens surface and a far-image-side lens surface of the imaging lens. Since N1 and N4 are in the following relationship: N1>N4, in a case where $|R1/R8|$: a parameter is increased or reduced, it means that a refractive power of a first surface of the first lens L1 is reduced or increased, or a refractive power of the image-side surface of the fourth lens L4 is increased or reduced. Beyond a range of the condition (4), on-axis chromatic aberration and chromatic aberration of magnification tend to cause an excessive correction.

The condition (6) is a condition to control a relationship between refractive powers of the object-side surface and the image-side surface of the first lens L1. In the condition (6), when $|R1/R2|$ is below the lower limit, astigmatism tends to cause an insufficient correction. Furthermore, when $|R1/R2|$ exceeds the upper limit, astigmatism tends to cause an excessive correction. Beyond a range of the condition (5), both on-axis chromatic aberration and chromatic aberration of magnification cause an excessive correction.

The condition (7) is a condition to control a relationship between refractive powers of the object-side surface and the image-side surface (the joined surface with the third lens L3) of the second lens L2. The second lens L2 is the positive lens having the convex surface having the large curvature at the image side. Accordingly, $|R4|$ and $|R5|$ are in the following relationship: $|R4|>|R5|$. However, in the condition (7), when $|R4/R5|$ is below the lower limit, a refractive power of an incident side surface is increased relative to a refractive power of the joined surface, a function of the joined surface is relatively decreased, astigmatism causes an insufficient correction, and barrel-shaped distortion excessively occurs. Furthermore, when $|R4/R5|$ exceeds the upper limit, the refractive power of the joined surface is relatively increased too much, and spherical aberration and astigmatism tend to cause an excessive correction.

By the conditions (4) to (7) as well as (1) to (3) being satisfied, it is possible to achieve a bright lens of which the f-number is smaller than 2.9 as well as an extremely fine performance as shown in later-described embodiments, and a compact-sized imaging lens of which an entire length is also short can be achieved as shown in each of the embodiments.

In addition, regarding the refractive indexes of the materials, it is preferable that the conditions: $N2 \geq 1.80$, $N3 \geq 1.695$, and $N4 \geq 1.69$ be satisfied in a range satisfying the condition: $N1>N2>N3 \geq N4$. Values of N3 and N4 may be approximately equal.

Although a variety of methods can be used for focusing, in a case where a method of extending the entire imaging lens system is adopted as described in an embodiment of the present invention, a simple configuration for lens moving can be achieved.

The imaging apparatus includes, for example, as shown in FIG. 12, the imaging lens according to an embodiment of the present invention configured to form the image and the solid-state image sensing device configured to receive the image formed by the imaging lens.

Such an imaging apparatus can be utilized as a digital still camera, a video camera, a hand-held terminal device, a monitoring camera, and so on. In particular, it can be preferably utilized as the digital still camera or the hand-held terminal device.

Embodiments of the imaging lens are illustrated in FIGS. 1, 3, 5, 7, and 9. These embodiments relate to specific first to fifth embodiments described later, respectively. Common reference numerals are used in these drawings to avoid a complication.

The imaging lens according to each of the embodiments illustrated in FIGS. 1, 3, 5, 7, and 9 is the imaging lens system including three lens groups having four lenses including the first lens L1, the second lens L2, the third lens L3, and the fourth lens L4 arranged in order from the object side (left direction of the drawings) and the aperture stop S arranged between the first lens L1 and the second lens L2. In the imaging lens system, the second lens L2 and the third lens L3 are joined each other.

In these drawings, reference numerals 1 to 8 used for the lenses and the aperture stop S indicate surfaces in order from the object side to the image side. These surfaces are referred to as a surface 1 to a surface 8. The surface 3 is a surface of the aperture stop S.

The first lens L1 is the negative meniscus lens having the convex surface 1 at the object side, the second lens L2 is the positive lens having the convex surface 5 having the large curvature at the image side, the third lens L3 is the negative lens having the concave surface 5 having the large curvature at the object side, and the fourth lens L4 is the positive lens having the convex surface 8 having the large curvature at the image side. Since the second lens L2 and the third lens L3 are joined each other, the convex surface 5 of the image side of the second lens L2 is also the concave surface 5 of the object side of the third lens L3.

Since the first lens L1 is the negative meniscus lens, the surface 2 of the first lens L1 at the image side is a concave surface at the image side, and a curvature radius of the surface 2 is smaller than that of the surface 1.

The surface 4 is a convex surface at the object side. The surface 6 is a concave surface at the image side. The surface 7 is a concave surface at the object side (in each of the first and second embodiments), a convex surface at the object side (in each of the fourth and fifth embodiments), or a flat surface (in the third embodiment).

In each of FIGS. 1, 3, 5, 7, and 9, a reference numeral FL indicates a cover glass or a variety of filters for the solid-state image sensing device as a transparent parallel plate equivalent thereto. The surface 9 is an incident side surface, and the surface 10 is an image-side surface.

In these embodiments, the lenses L1 to L4 and the aperture stop S are integrally extended to the object side to perform focusing.

A hand-held terminal device as an imaging apparatus according to an embodiment of the present invention will be explained with reference to FIGS. 11A to 11C and FIG. 12.

The hand-held terminal device includes a camera device as a camera functional section.

Figure 11A:
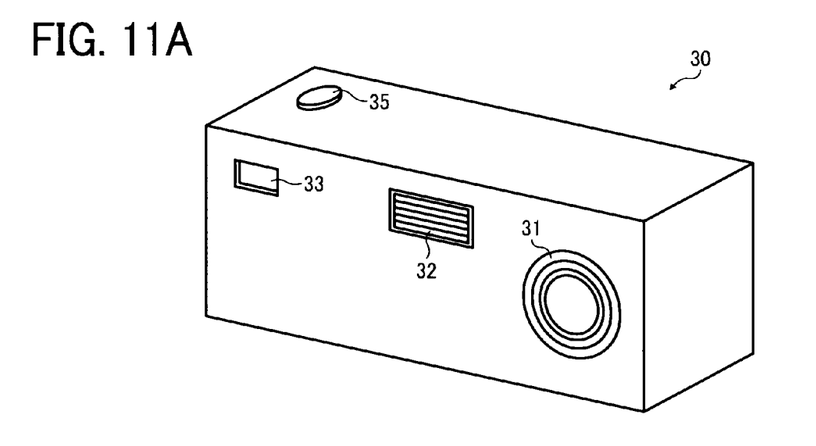
FIGS. 11A to 11C are views explaining an imaging apparatus according to an embodiment of the present invention.
Figure 11B:
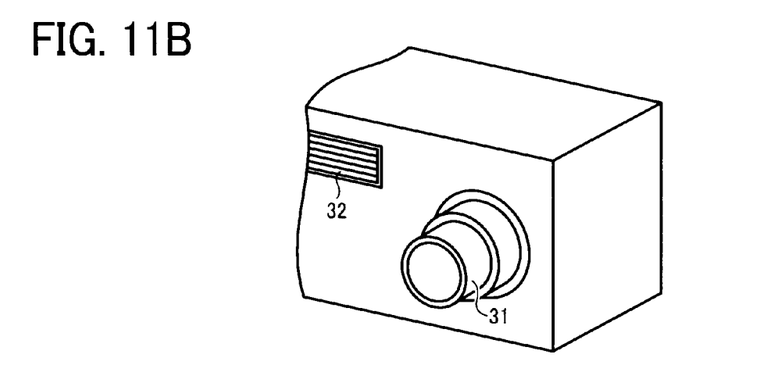
Figure 11C:
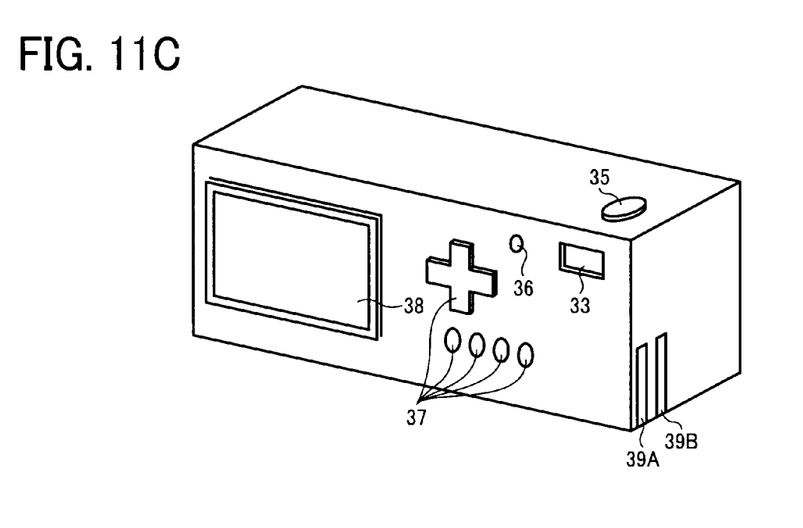

FIGS. 11A to 11C illustrate an external appearance of the camera device (the camera functional section of the hand-held terminal device), and FIG. 12 illustrates a system configuration of the hand-held terminal device.

As shown in FIG. 12, the hand-held terminal device 30 includes the photographic lens 31 and the light receiving element (the solid-state image sensing device in which 7 million pixels or more are two-dimensionally arranged) 45. The hand-held terminal device 30 is configured such that the light receiving element 45 reads an image of an object for photographing formed by the photographic lens 31.

An imaging lens according to an embodiment of the present invention, more specifically, an imaging lens according to first to fifth embodiments described later is used as the photographic lens 31.

As shown in FIG. 12, the hand-held terminal device 30 further includes a viewfinder 33, a liquid crystal display 38, a CPU (Central Processing Unit) 40, an image processor 41, a signal processor 42, a communication card 43 or the like, and a semiconductor memory 44.

Output from the light receiving element 45 is processed in the signal processor 42 controlled by the CPU 40, and the processed output is converted into digital information. After being subjected to a predetermined image processing in the image processor 41 controlled by the CPU 40, the converted digital image information is recorded on the semiconductor memory 44.

An image during photographing or a photographed image, which is subjected to the image processing in the image processor 41, may be displayed on the liquid crystal display 38, and also an image recorded on the semiconductor memory 44 may be displayed thereon. Furthermore, the image recorded on the semiconductor memory 44 may be transmitted outside by use of the communication card 43 or the like.

The image processor 41 also has a function to perform an electrical correction on shading, trimming of a central part of the image, and the like.

As shown in FIGS. 11A to 11C, the hand-held terminal device 30 further includes a shutter button 35, a power switch 36, operation buttons 37, and slots 39A, 39B.

When a user carries the hand-held terminal device 30, a lens barrel of the photographic lens 31 thereof is in a collapsed state as shown in FIG. 11A, and when the user turns the power on by operating the power switch 36, the lens barrel is extended as shown in FIG. 11B.

Focusing in which the entire imaging lens system and the aperture stop S are integrally extended to the object side is carried out by half-pressing of the shutter button 35.

The operation buttons 37 shown in FIG. 11C are used when the image recorded on the semiconductor memory 44 is displayed on the liquid crystal display 38 or transmitted outside by use of the communication card 43 or the like. The semiconductor memory 44 and the communication card 43 and the like are inserted in the slots 39A, 39B to be used, respectively, the slots 39A, 39B being special or generalized.

When the lens barrel of the photographic lens 31 is in the collapsed state, each of the lenses does not always have to be arranged in a position on an optical axis. For example, in such a collapsed state, if a mechanism is such that the second lens L2 and the third lens L3 are retracted from positions on the optical axis and housed in parallel with other lens groups, the hand-held terminal device 30 may be further slimmed.

For the hand-held terminal device 30 including the camera device as a photographing functional section as explained above, an imaging lens according to first to fifth embodiments described later may be used as the photographic lens 31, and the hand-held terminal device 30 having a function of a high-image-quality and compact-sized camera can be achieved, the hand-held terminal device 30 using the light receiving element 45 having 7 million pixels or more.

In addition, the viewfinder 33 may be omitted.

EMBODIMENTS

Hereinafter, specific data for lens configurations shown in FIGS. 1, 3, 5, 7, and 9 are indicated as first to fifth embodiments.

Reference numerals and symbols used hereinafter denote as follows:

F: focal length of entire imaging lens system
F No.: numerical aperture (f-number)
$\omega$: half angle of view (degree)
R: curvature radius of lens surface
D: interval between lens surfaces
Nd: refractive index for d line
Vd: Abbe number for d line The aspheric surface is expressed by the following known formula:

$$X = (H^2/R)/[1+\{1-k(H/r)^2\}^{1/2}] + C4H^4 + C6H^6 + C8H^8 + C10H^{10} + \ldots$$

where X is a depth in the optical axis direction, H is height from the optical axis, R is a paraxial curvature radius, k is a conic constant, and C4 to C10 are high-order aspheric coefficients.

First Embodiment

The following Table 1 shows data of the first embodiment when F=6.41 mm, F No.=2.81, $\omega$=32.6 degrees.

TABLE 1

| SURFACE | R | D | Nd | Vd |
|---|---|---|---|---|
| 1 | 3.04 | 1.6 | 1.923 | 20.8 |
| 2 | 1.83 | 1.82 | | |
| 3 | ∞ | 0.1 | | |
| 4 | 7.29 | 1.80 | 1.835 | 42.7 |
| 5 | −2.06 | 0.5 | 1.699 | 30.0 |
| 6 | 9.73 | 0.68 | | |
| 7 | −12.48 | 2.26 | 1.694 | 53.2 |
| 8 | −3.33 | 4.93 | | |
| 9 | ∞ | 0.8 | 1.517 | 64.2 |
| 10 | ∞ | | | |

Aspheric Surface
  Data of aspheric surfaces are shown below.
  Object-side surface of fourth lens (surface 7)
  k=0.0
  C4=−6.477E−03

C6=−6.558E−04
C8=−4.552E−04
C10=1.660E−04
C12=−3.695E−05
Image-side surface of fourth lens (surface 8)
k=0.23
C4=1.247E−03
C6=−1.264E−05
C8=−1.282E−05
C10=3.513E−06
C12=−4.279E−07

Note that in the present and following embodiments, values such as "−4.279E−07" denote "−4.279×$10^{−7}$".

Parameters of Conditions

A parameter of each of the conditions is as follows.

In addition, note that in the present and following embodiments, a unit of numerical values of $|f23/(F \cdot R5)|$: a parameter of the condition (4) is 1/mm.

$|f1/F|=2.1$ $|f1/f23|=1.5$ $N1=1.9$ $|f23/(F \cdot R5)|=0.7$ $|R1/R8|=0.9$ $|R1/R2|=1.7$ $|R4/R5|=3.5$ Second Embodiment The following Table 2 shows specific data of the second embodiment when F=6.24 mm, F No.=2.79, ω=33.4 degrees.

TABLE 2

| SURFACE | R | D | Nd | Vd |
|---|---|---|---|---|
| 1 | 3.02 | 1.6 | 2.003 | 28.3 |
| 2 | 1.78 | 1.73 | | |
| 3 | ∞ | 0.1 | | |
| 4 | 8.04 | 1.68 | 1.804 | 46.5 |
| 5 | −2.08 | 0.5 | 1.673 | 32.0 |
| 6 | 14.89 | 0.55 | | |
| 7 | −13.64 | 2.40 | 1.619 | 63.8 |
| 8 | −3.07 | 4.89 | | |
| 9 | ∞ | 0.8 | 1.517 | 64.2 |
| 10 | ∞ | | | |

Aspheric Surface
Data of aspheric surfaces are shown below.
Object-side surface of fourth lens (surface 7)
k=0.0
C4=−6.229E−03
C6=−1.290E−04
C8=−1.660E−04
Image-side surface of fourth lens (surface 8)
k=−0.76
C4=−1.636E−03
C6=−2.404E−04
C8=4.484E−05
C10=−1.080E−06
C12=4.845E−07

Parameters of Conditions
A parameter of each of the conditions is as follows.

$|f1/F|=2.0$ $|f1/f23|=1.4$ $N1=2.0$ $|f23/(F \cdot R5)|=0.65$ $|R1/R8|=1.0$ $|R1/R2|=1.7$ $|R4/R5|=3.9$ Third Embodiment The following Table 3 shows data of the third embodiment when F=6.21 mm, F No.=2.67, ω=33.5 degrees.

TABLE 3

| SURFACE | R | D | Nd | Vd |
|---|---|---|---|---|
| 1 | 3.30 | 2.0 | 2.003 | 28.3 |
| 2 | 1.80 | 1.74 | | |
| 3 | ∞ | 0.2 | | |
| 4 | 8.05 | 1.82 | 1.804 | 46.5 |
| 5 | −2.16 | 1.14 | 1.699 | 30.0 |
| 6 | 17.05 | 0.61 | | |
| 7 | ∞ | 1.80 | 1.801 | 45.4 |
| 8 | −4.31 | 4.50 | | |
| 9 | ∞ | 0.8 | 1.517 | 64.2 |
| 10 | ∞ | | | |

Aspheric Surface
Data of an aspheric surface are shown below.
Image-side surface of fourth lens (surface 8)
k=−0.61
C4=9.767E−04
C6=1.055E−04
C8=−2.262E−06
C10=5.975E−07

Parameters of Conditions
A parameter of each of the conditions is as follows.

$|f1/F|=1.9$ $|f1/f23|=1.3$ $N1=2.0$ $|f23/(F \cdot R5)|=0.7$ $|R1/R8|=0.8$ $|R1/R2|=1.8$ $|R4/R5|=3.7$ Fourth Embodiment The following Table 4 shows data of the fourth embodiment when F=6.16 mm, F No.=2.88, ω=33.9 degrees.

TABLE 4

| SURFACE | R | D | Nd | Vd |
|---|---|---|---|---|
| 1 | 3.26 | 2.05 | 1.847 | 23.7 |
| 2 | 1.72 | 1.35 | | |

TABLE 4-continued

| SURFACE | R | D | Nd | Vd |
|---|---|---|---|---|
| 3 | ∞ | 0.10 | | |
| 4 | 9.94 | 2.08 | 1.835 | 42.7 |
| 5 | −2.15 | 0.61 | 1.699 | 30.0 |
| 6 | 14.1 | 0.94 | | |
| 7 | 115.2 | 1.80 | 1.635 | 53.2 |
| 8 | −3.64 | 4.79 | | |
| 9 | ∞ | 0.8 | 1.517 | 64.2 |
| 10 | ∞ | | | |

Aspheric Surface
Data of aspheric surfaces are shown below.
Object-side surface of fourth lens (surface 7)
k=−0.048
C4=−5.271E−05
C6=−4.581E−05
C8=1.471E−05
C10=−1.401E−06
Image-side surface of fourth lens (surface 8)
k=−1.5962
C4=−1.799E−03
C6=3.827E−06
C8=1.258E−05
C10=−4.609E−07

Parameters of Conditions
A parameter of each of the conditions is as follows.

$|f1/F|=1.8$ $|f1/f23|=1.1$ $N1=1.847$ $|f23/(F \cdot R5)|=0.8$ $|R1/R8|=0.9$ $|R1/R2|=1.9$ $|R4/R5|=4.6$ Fifth Embodiment The following Table 5 shows data of the fifth embodiment when F=7.76 mm, F No.=2.88, ω=28.1 degrees.

TABLE 5

| SURFACE | R | D | Nd | Vd |
|---|---|---|---|---|
| 1 | 3.52 | 2.13 | 1.904 | 31.3 |
| 2 | 1.94 | 1.45 | | |
| 3 | ∞ | 0.25 | | |
| 4 | 8.30 | 2.02 | 1.800 | 42.3 |
| 5 | −2.71 | 0.5 | 1.699 | 30.0 |
| 6 | 6.63 | 0.78 | | |
| 7 | 20.16 | 2.30 | 1.623 | 58.1 |
| 8 | −3.66 | 6.42 | | |
| 9 | ∞ | 0.8 | 1.517 | 64.2 |
| 10 | ∞ | | | |

Aspheric Surface
Data of an aspheric surface are shown below.
Image-side surface of fourth lens (surface 8)
k=−1.3627
C4=2.151E−03
C6=1.195E−05
C8=−2.844E−06
C10=4.310E−08

Parameters of Conditions
A parameter of each of the conditions is as follows.

$|f1/F|=1.7$ $|f1/f23|=0.5$ $N1=1.904$ $|f23/(F \cdot R5)|=1.2$ $|R1/R8|=1.0$ $|R1/R2|=1.8$ $|R4/R5|=3.1$ In each of the embodiments, the image-side surface of the fourth lens L4 or both the image-side surface and the object-side surface of the fourth lens L4 is/are an aspheric surface(s), and aberrations occurring in the first lens L1 to the third lens L3 are sufficiently corrected by the aspheric surface(s).

Figure 1:
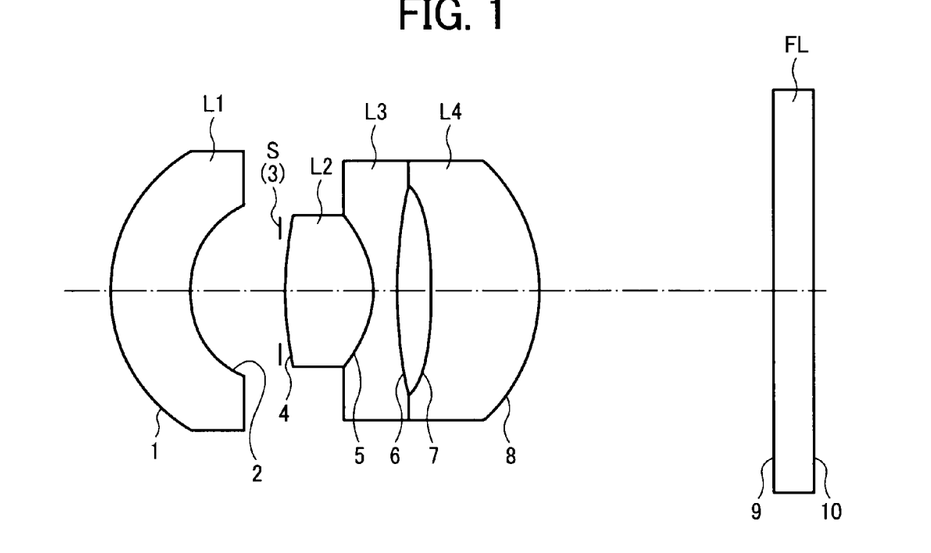
FIG. 1 is a view showing a lens configuration according to a first embodiment of the present invention.
Figure 2:
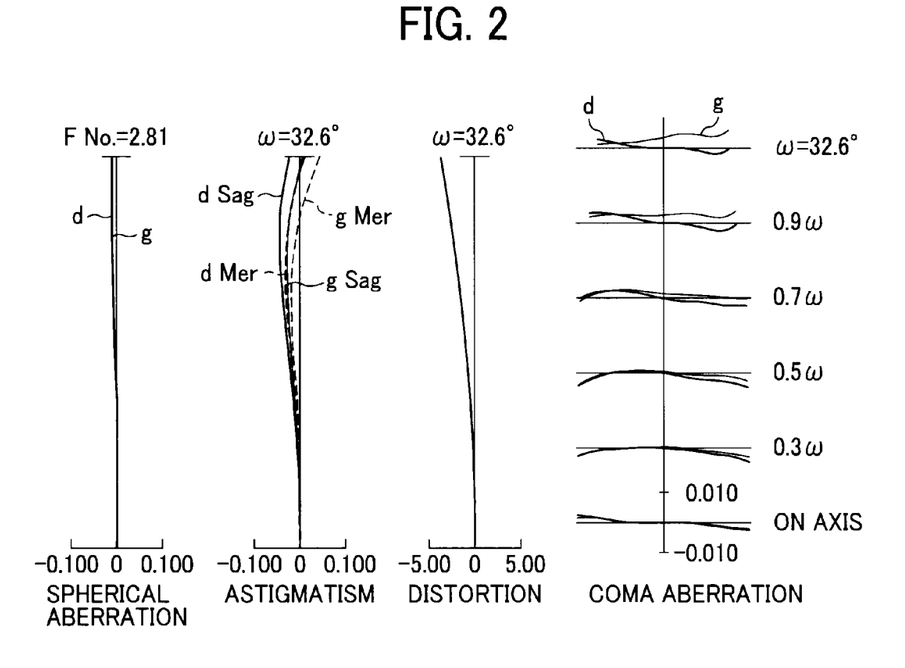
FIG. 2 is a view illustrating aberrations according to the first embodiment of the present invention.
Figure 3:
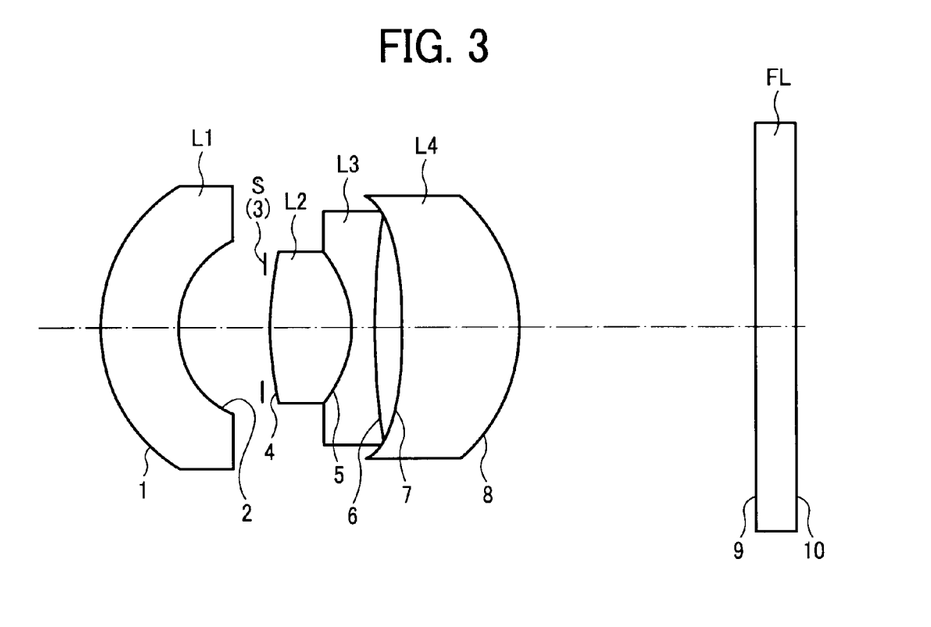
FIG. 3 is a view showing a lens configuration according to a second embodiment of the present invention.
Figure 4:
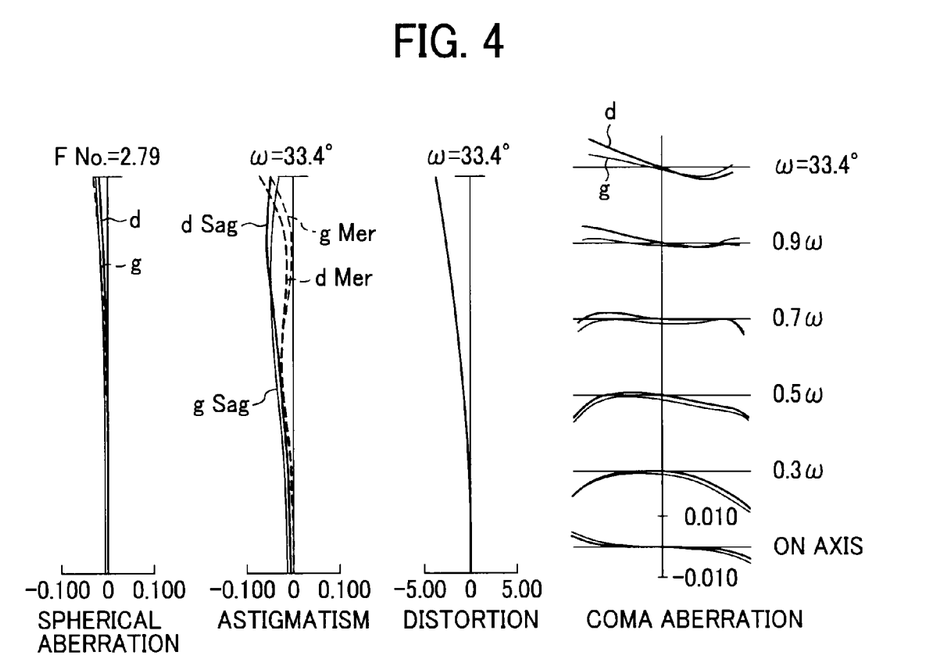
FIG. 4 is a view illustrating aberrations according to the second embodiment of the present invention.
Figure 5:
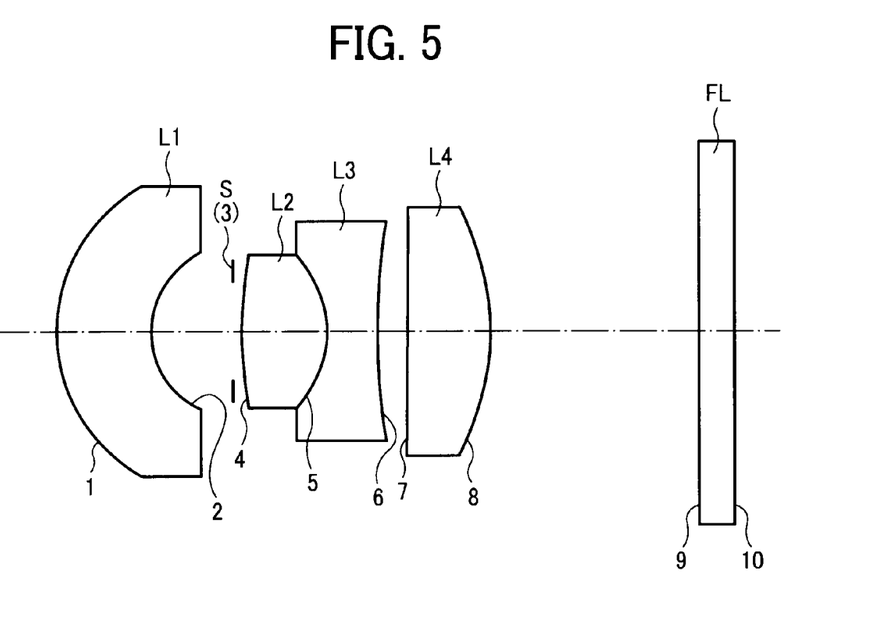
FIG. 5 is a view showing a lens configuration according to a third embodiment of the present invention.
Figure 6:
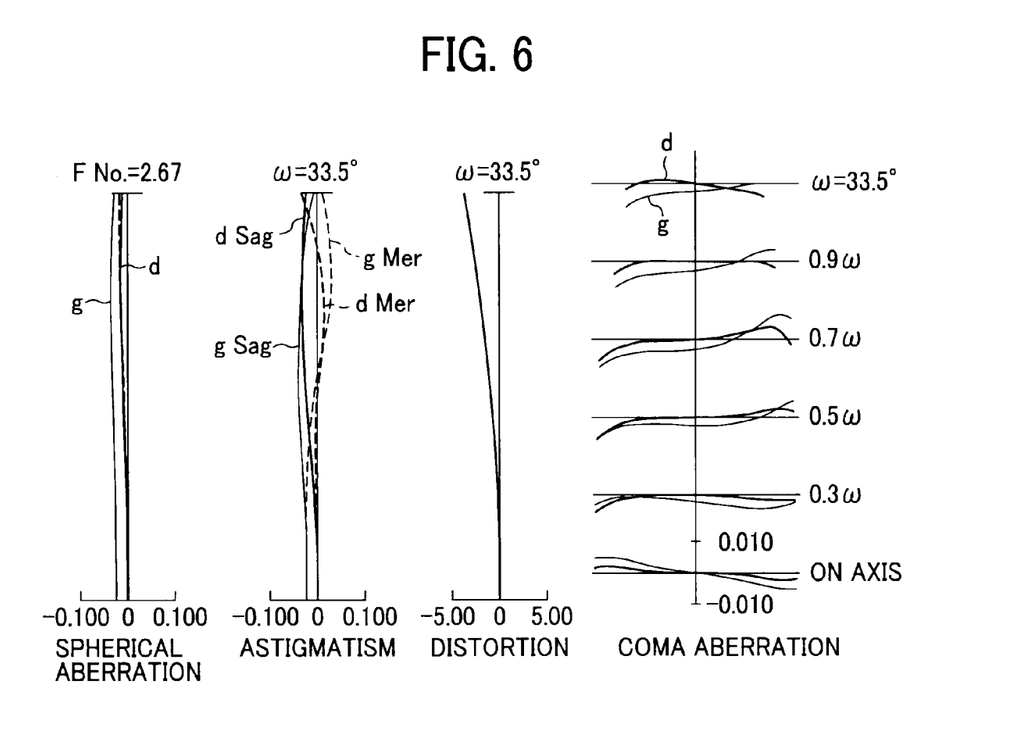
FIG. 6 is a view illustrating aberrations according to the third embodiment of the present invention.
Figure 7:
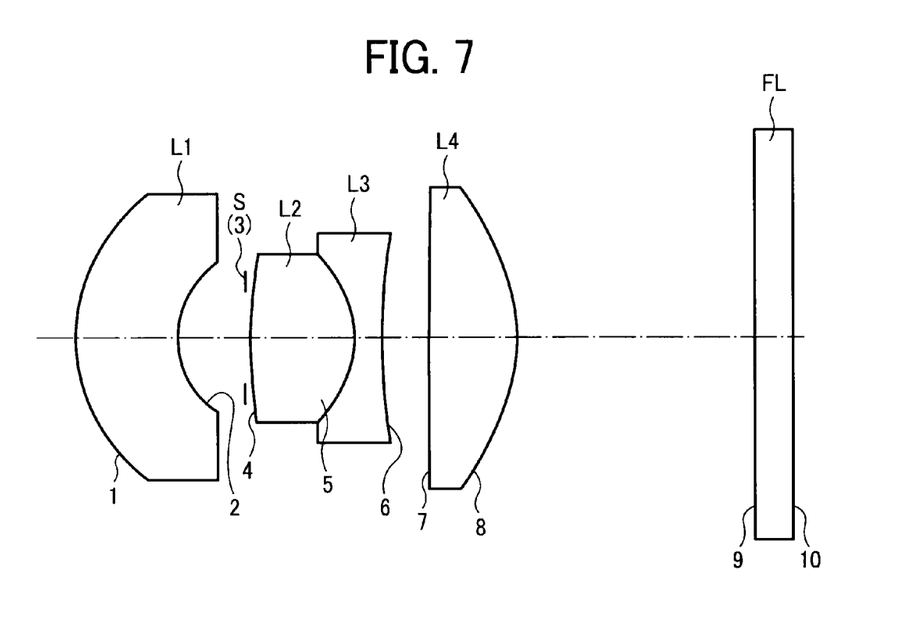
FIG. 7 is a view showing a lens configuration according to a fourth embodiment of the present invention.
Figure 8:
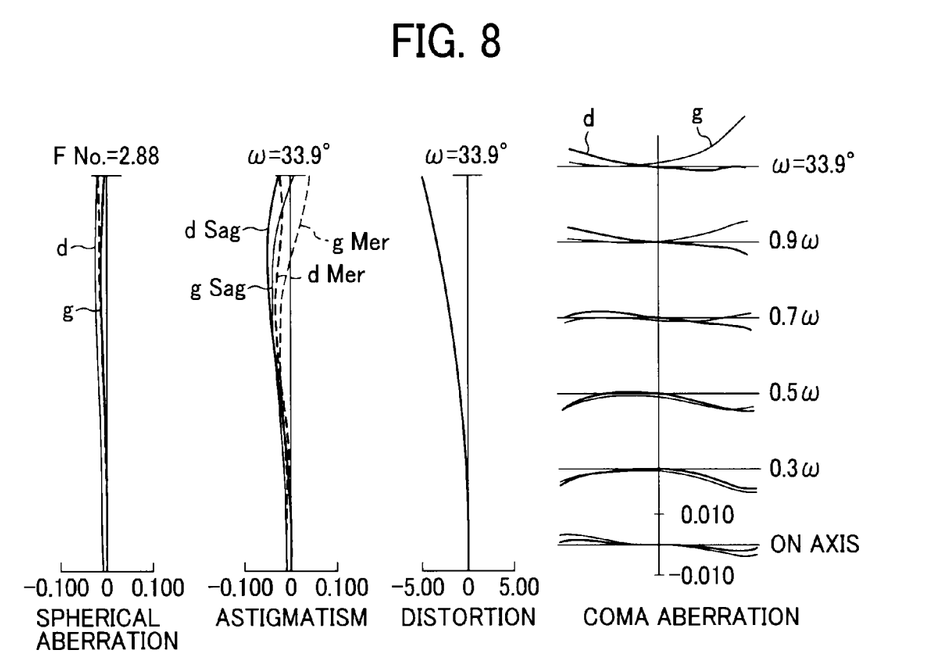
FIG. 8 is a view illustrating aberrations according to the fourth embodiment of the present invention.
Figure 9:
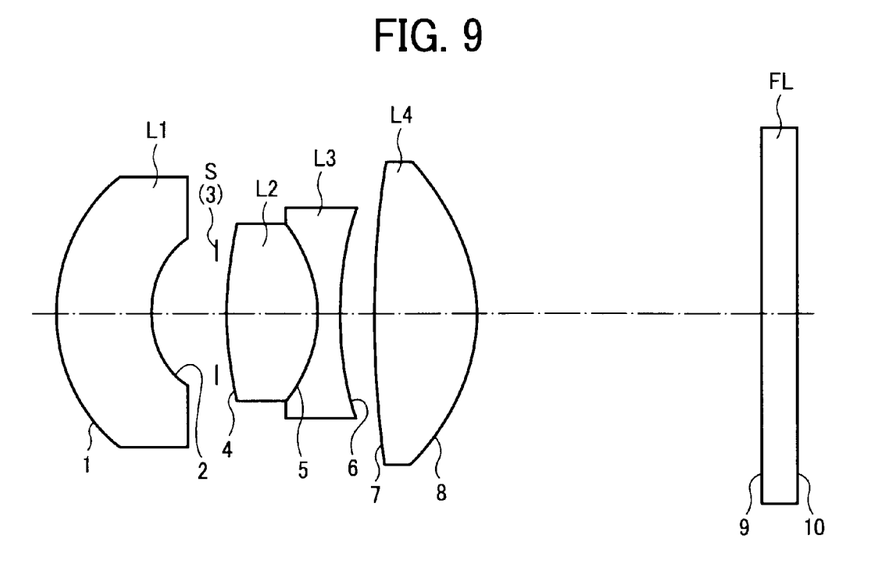
FIG. 9 is a view showing a lens configuration according to a fifth embodiment of the present invention.
Figure 10:
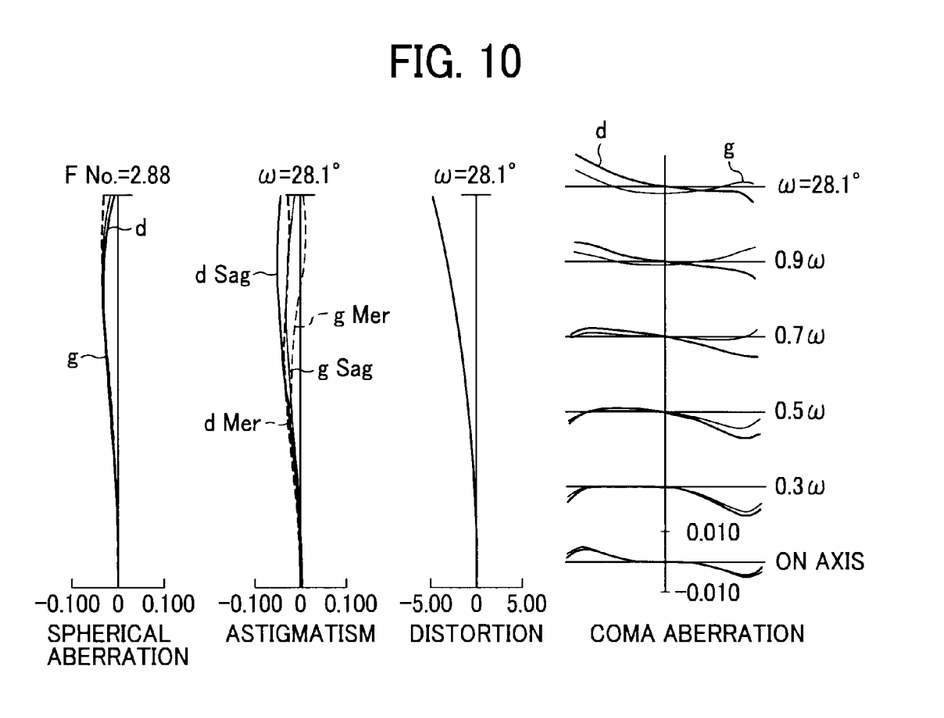
FIG. 10 is a view illustrating aberrations according to the fifth embodiment of the present invention.

FIG. 2 is a view illustrating aberrations according to the first embodiment mentioned above. Furthermore, FIGS. 4, 6, 8, and 10 are views illustrating aberrations according to the second to fifth embodiments, respectively.

These views of aberrations are regarding d lines and g lines. In the drawings, "d" and "g" denote "a d line" and "a g line", respectively. In the spherical aberration in the drawings, the broken line indicates a sine condition. In the astigmatism in the drawings, the solid line indicates sagittal astigmatism (shown as "d Sag" and "g Sag" in the drawings), and the broken line indicates meridional astigmatism (shown as "d Mer" and "g Mer" in the drawings).

As seen from these drawings of aberrations, a fine performance is achieved in each of the embodiments. Furthermore, the f-number is smaller than 2.9 and a bright lens is achieved in each of the embodiments.

The distance between an exit pupil position and an image plane in each of the embodiments is as follows.
First embodiment: −14.5 mm
Second embodiment: −14.5 mm
Third embodiment: −14.5 mm
Fourth embodiment: −16.9 mm
Fifth embodiment: −18.0 mm As seen from the above, the imaging lens having a high telecentric performance in the image side is achieved in each of the embodiments.

Furthermore, the distance from the object-side surface of the first lens L1 to the image plane is as follows.
First embodiment: 14.5 mm
Second embodiment: 14.3 mm
Third embodiment: 14.6 mm
Fourth embodiment: 14.5 mm
Fifth embodiment: 16.7 mm Although each of the above values includes the thickness of a filter (FL): 0.9 mm, as seen from the above, a compact-sized lens of which an entire length is short is achieved in each of the embodiments. In addition, regarding a lens diameter, Φ: an effective diameter of the first lens L1 which has the largest lens diameter in the imaging lens system mentioned above is 5.7 mm in each of the embodiments, and the compact-sized lens is achieved.

As explained above, according to an embodiment of the present invention, a bright, compact-sized, and fine-performance imaging lens can be achieved, the imaging lens having the fine telecentric performance of the image side which is appropriate to the imaging apparatus in which the solid-state image sensing device is used.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging lens system, comprising:
    three lens groups having four lenses including a first lens, a second lens, a third lens, and a fourth lens arranged in order from an object side; and
    an aperture stop arranged between the first lens and the second lens, wherein
    the second lens and the third lens are joined each other;
    the first lens is a negative meniscus lens having a convex surface at an object side;
    the second lens is a positive lens having a convex surface having a large curvature at an image side;
    the third lens is a negative lens having a concave surface having a large curvature at an object side;
    the fourth lens is a positive lens having a convex surface having a large curvature at an image side;
    the following conditions are satisfied:

$1.4 < |f1/F| < 2.2$ $0.4 < |f1/f23| < 1.6$ where F is a focal length of the entire imaging lens system, f1 is a focal length of the first lens, and f23 is a combined focal length of the second lens and the third lens which are joined each other; and
    the following condition is satisfied:

$1.80 < N1$ where N1 is a refractive index of material of the first lens for a d line.

2. The imaging lens system according to claim 1, wherein the following condition is satisfied:

$N1 > N2 > N3 \geq N4$ where N1 to N4 are refractive indexes of materials of the first lens to the fourth lens for d lines, respectively;
    the following condition is satisfied:

$0.5/\text{mm} < |f23/(F \cdot R5)| < 1.3/\text{mm}$ where R5 is a curvature radius of a joined surface of the second lens and the third lens; and
    the following conditions are satisfied:

$0.5 < |R1/R8| < 1.2$ $1.5 < |R1/R2| < 2.0$ $3.0 < |R4/R5| < 5.0$ where R1 and R2 are curvature radii of an object-side surface and an image-side surface of the first lens, respectively, R4 is a curvature radius of an object-side surface of the second lens, and R8 is a curvature radius of an image-side surface of the fourth lens.

3. The imaging lens system according to claim 1, wherein the entire imaging lens system is extended to the object side to perform focusing.

4. An imaging apparatus, comprising:
    the imaging lens system according to claim 1 configured to form an image; and
    a solid-state image sensing device configured to receive the image formed by the imaging lens system.

* * * * *